128,267

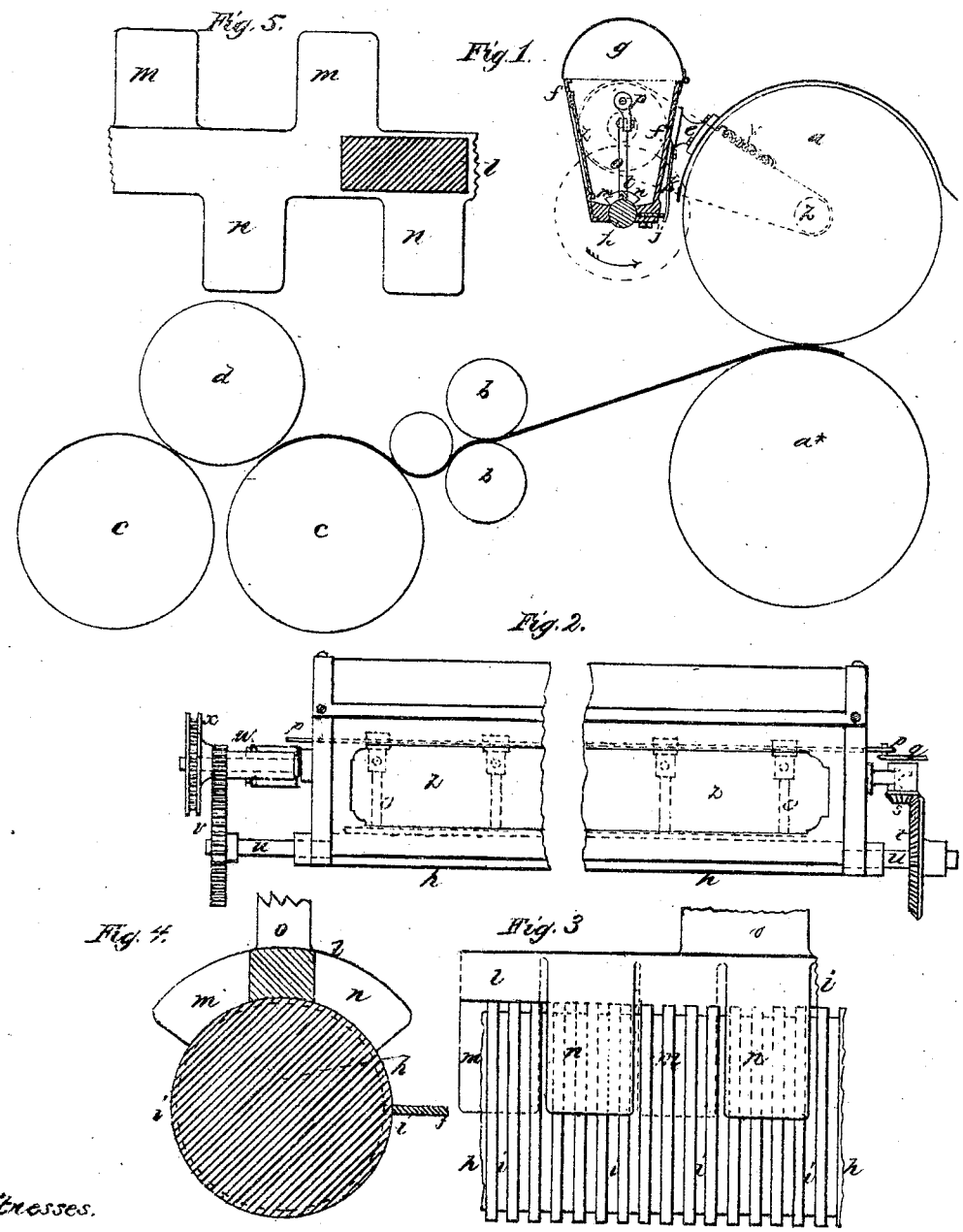

UNITED STATES PATENT OFFICE.

FREDERICK WILKINSON, OF MANCHESTER, ENGLAND.

IMPROVEMENT IN BLUING COTTON FIBERS.

Specification forming part of Letters Patent No. 128,267, dated June 25, 1872.

I, FREDERICK WILKINSON, of Manchester, in the county of Lancaster, England, yarn agent, have invented Improvements in the Treatment of Cotton previous to its being spun into yarn, of which the following is a specification:

My invention consists in a treatment of cotton whereby an improved white appearance is obtained which remains after it has been spun into yarn. To accomplish this, I diffuse through the cotton during any of the usual preparation processes—such as that of scutching—a small quantity of blue powder, which I find effects the desired object without imparting an evident blue tint. In practice, I have found the ultramarine of commerce to answer the purpose, combined with French chalk, common chalk, or similar white powder, in order to bring it to a sufficiently pale color for convenient use. The preparation of the powder may be varied as regards proportions, but I will mention a combination which I have found to answer. I take of ultramarine of commerce two parts—not, of course, the expensive artists' color, but that which is used for ornamental papers and for other purposes, and which is sometimes called French ultramarine—to this I add one part of French or common chalk reduced to a fine powder, and the material is then ready for use, and may be sifted or otherwise distributed among the fibers of the cotton by any suitable apparatus during the scutching or other such preparation process. I will, however, describe, by reference to the accompanying drawing, an arrangement of distributing apparatus which I have found to answer the purpose.

Figure 1 is a partial view, in section, of a scutcher with my improvement adapted; Fig. 2, a side view, detached, of the distributing apparatus; and Figs. 3, 4, 5, other detached views.

At $a$ $a^*$ are the two "cages;" at $b$ $b$, are the calender-rollers; at $c$ $c$, the surface-drums; and at $d$, the lap of material, the course of which is shown by the thick black line. To the casing of the machine are fixed brackets, $e$, which carry a box or hopper, $f$, provided with a cover, $g$. The bottom of this box or hopper is formed with an orifice which is closed by a roller, $h$, formed with annular flutes $i$, as seen in the detached views, Figs. 3 and 4. At $j$ is a plate formed with teeth, which project into the flutes $i$ so as to constitute a "doctor," capable of sliding in a groove formed in the bottom of the box or hopper, but pressed forward against the interior of the flutes $i$ by springs $k$. Above the roller $h$ is a saddle-piece, $l$, provided with curved parts $m$ $n$, which extend partly around the surface of the said roller, a detached view thereof being shown at Fig. 5. Extending from the piece $l$ are rods $o$, connected at their upper ends to a rod, $p$, which is capable of sliding in bearings formed in the ends of the box or hopper $f$. This rod $p$ is connected at one end to a crank-pin, $q$, carried by a shaft, $r$, the lower end of which has a bevel-pinion, $s$, in gear with a wheel, $t$, mounted on the shaft $u$ of the roller $h$, which shaft on the other side has a spur-wheel, $v$, in gear with a pinion, $w$, the shaft of which is provided with a chain-wheel, $x$, driven by means of a chain, $y$, passing over a pulley, $z$, on the axis of the top cage $a$.

The powder, prepared as above described, is placed in the box or hopper $f$, and on rotatory motion being communicated to the machine, the roller $h$ is caused to revolve slowly in the direction of the arrow. This motion continuously carries forward the blue powder which lies in the flutes $i$, and the toothed doctor $j$ causes it to fall in a fine stream upon the sliver as it passes onward to the lap, the box or hopper $f$ and roller $h$ extending, of course, along the whole width of the machine.

During the above-described operation, the crank-pin $q$, driven by the wheel $t$, will impart a reciprocating motion to the rod $p$, and consequently to the curved parts $m$ $n$, which, by traveling to and fro upon the surface of the roller $h$, secure the filling of the flutes $i$ with powder. At $z$ is a glass front to the box or hopper, so that the attendant may see the quantity of powder therein, and for assisting the fall of the said powder. The quantity of powder to be distributed will vary according to the effect desired to be produced, and the original quality of the cotton; but will readily be found by trial. In order, however, to afford a guide, I may state that, supposing the scutcher to be passing two hundred and fifty pounds of cotton per hour, about six to seven ounces of the powder may be used, and this quantity will be distributed by the roller $h$ if the flutes $i$ are about one-twelfth of an inch square, and the solid intervening parts of the same dimensions; the roller being driven at the rate of one revolution in about five minutes. These particulars are, however, to be considered as approximations, only.

The above-described operations have been supposed to take place at the first scutcher, after which the lap is passed, with others treated in the same manner, with powder, through the second scutcher, if there be one used, as usual, and the said powder thus becomes diffused intimately among the fibers.

I have above specially alluded to my invention in connection with the scutcher; but it may be adapted to the carding-engine, or other opener or cleaner which admits of the cotton being subsequently operated upon by a beating or opening process, in order to diffuse the powder. When my invention is adapted to the scutcher and only one beater is employed, I prefer distributing the powder at the feed end, so that a certain quantity may be beaten out before the material is taken to the carding-engine; but in other cases I prefer the plan fully described.

Having thus described my invention, what I claim as new, and desire to protect by Letters Patent, is—

1. The process of giving an even creamy tint to the fiber of cotton, by diffusing therethrough a blue-tinted powder, just before or while the cotton is passing through the "scutcher" or picker, as described, and for the purpose set forth.

2. The combination, with a scutcher, of a hopper, $f$, provided with fluted roll $h\ i$, spring-held toothed plate $j\ k$, and saddle-piece $l\ m\ n$, operated as and for the purpose described.

FREDK. WILKINSON.

Witnesses:
   WM. TUDOR MABLEY, *Manchester*,
   ROBT. ROBSON, *Manchester*.